United States Patent [19]

Baumgartner et al.

[11] Patent Number: 5,077,093
[45] Date of Patent: Dec. 31, 1991

[54] MEANS AND DEVICE FOR UNIFORMLY LOADING ONE-PIECE CARRIER MEMBERS WITH A DEFINED QUANTITY OF DISPERSIONS OR SOLUTIONS

[75] Inventors: Winfried Baumgartner; Bernhard Schaeuble, both of Rheinfelden, Fed. Rep. of Germany

[73] Assignee: Degussa Aktiengesellschaft, Frankfurt am Main, Fed. Rep. of Germany

[21] Appl. No.: 521,729

[22] Filed: May 10, 1990

[30] Foreign Application Priority Data

May 13, 1989 [DE] Fed. Rep. of Germany ....... 3915685

[51] Int. Cl.$^5$ .............................................. B05D 3/00
[52] U.S. Cl. .................................. 427/294; 427/430.1; 427/345; 427/346; 118/429
[58] Field of Search ...................... 427/294, 430.1, 238, 427/244, 345, 346; 118/50, 428, 429

[56] References Cited

U.S. PATENT DOCUMENTS

| | | | |
|---|---|---|---|
| 2,657,668 | 11/1953 | Maier | 118/429 X |
| 3,310,427 | 3/1967 | Cheney et al. | 118/429 X |
| 3,948,213 | 4/1976 | Hayec et al. | 118/50 |
| 4,311,735 | 1/1982 | Young | 118/50 |
| 4,384,014 | 5/1983 | Young | 427/294 |
| 4,471,712 | 9/1984 | Voigt et al. | 118/50 |
| 4,550,034 | 10/1985 | Shimrock et al. | 427/294 X |
| 4,553,499 | 11/1985 | Crone, Jr. et al. | 118/428 |

Primary Examiner—Shrive Beck
Assistant Examiner—Alain Bashore
Attorney, Agent, or Firm—Beveridge, DeGrandi & Weilacher

[57] ABSTRACT

The invention relates to an upwardly closed assembly and a simpler upwardly open assembly for uniformly loading one-piece carrier members, more particularly for catalysts, with a desired quantity of dispersions or solutions, the assembly being in the form of a cup receiving the bottom part of the carrier member and a distributor head for placing in sealing-tight manner on the carrier and having a perforated tray, formed with drip spouts at each outlet mouth, for distributing the applied liquid and, in the case of the upwardly-closed embodiment, including a cover and a number of pipes on the distributor head for supplying liquid, aerating and deaerating and a discharge pipe in the cup. The invention also relates to a method of operating the assembly and having features providing inter alia for movement of the distributor head relative to the carrier members in order to improve the distributor of liquid over the top surface of the carrier.

34 Claims, 10 Drawing Sheets

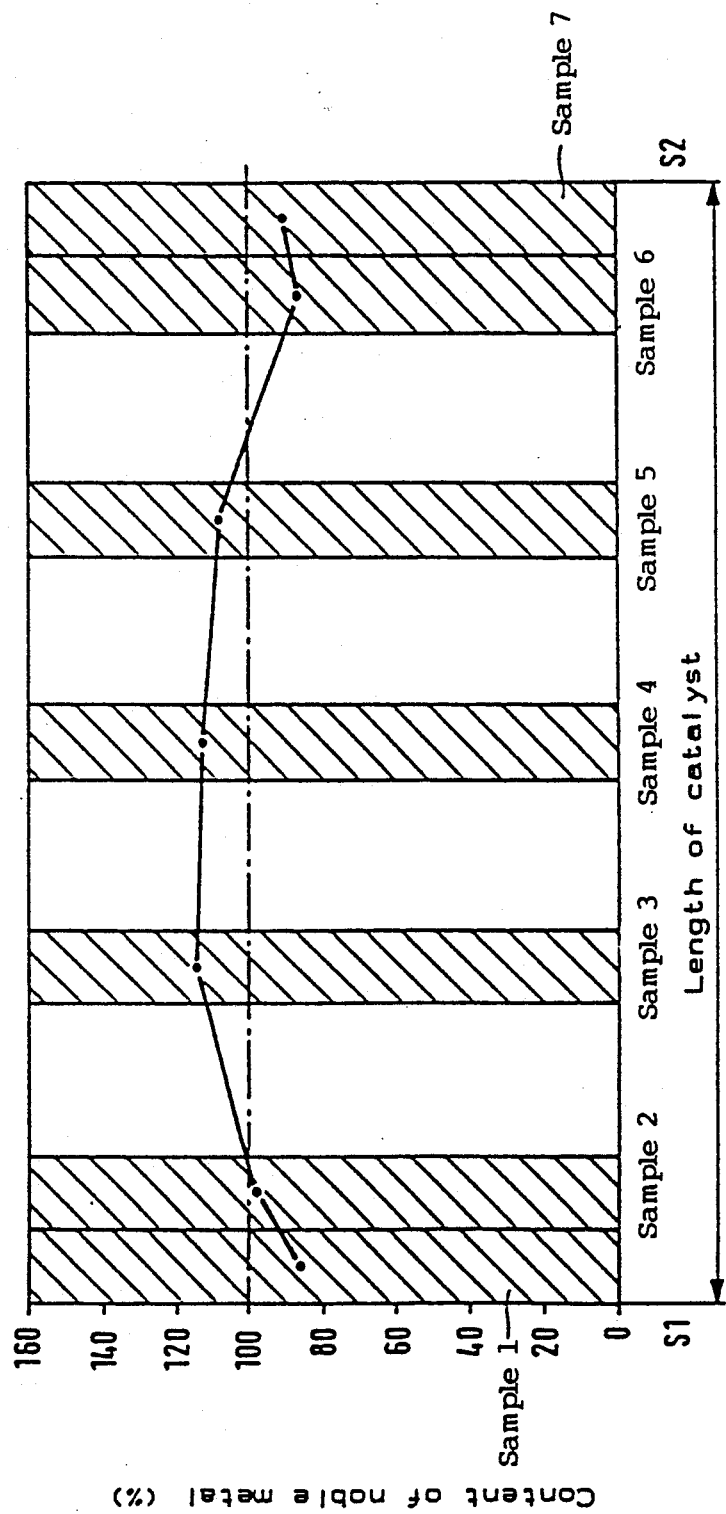

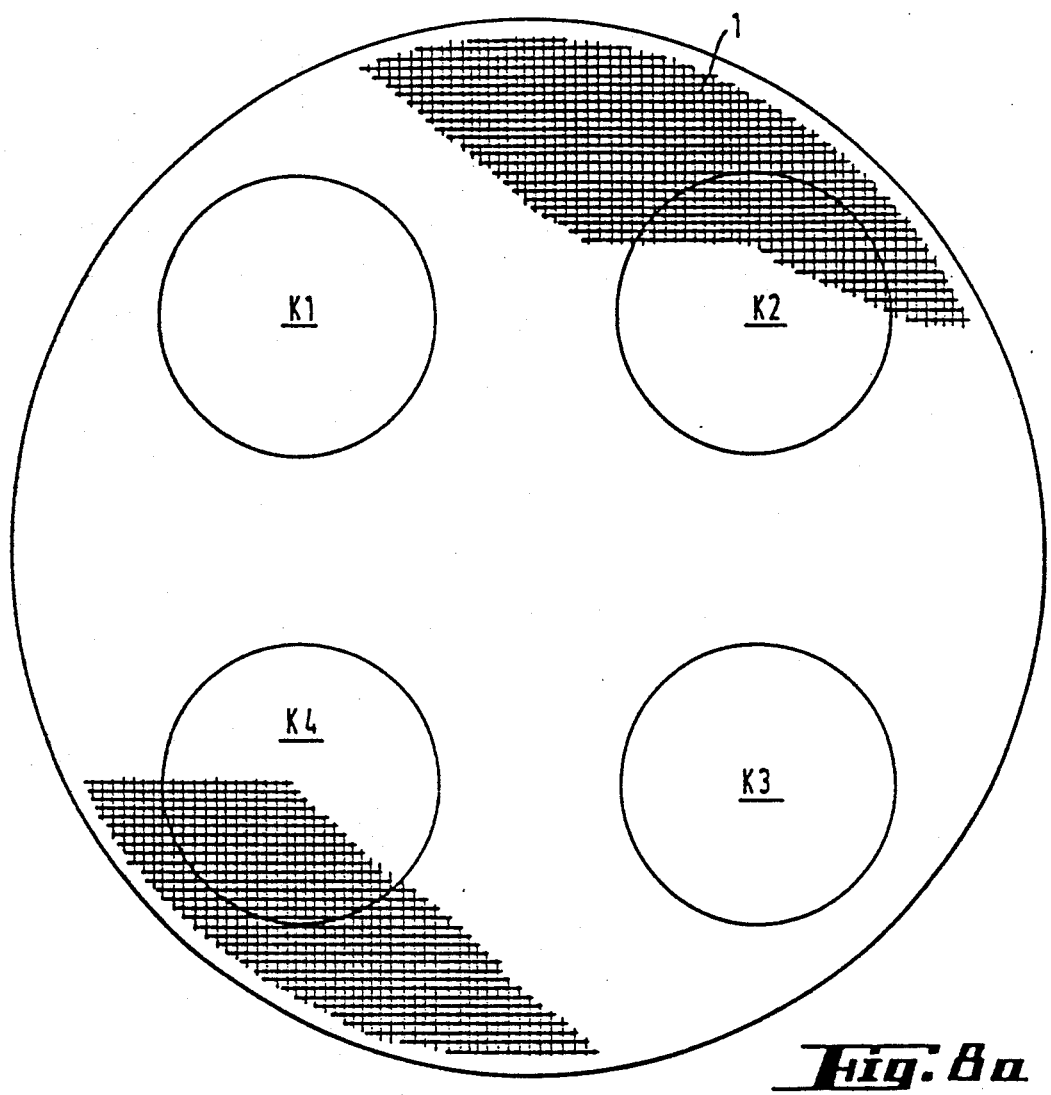
Fig. 8a
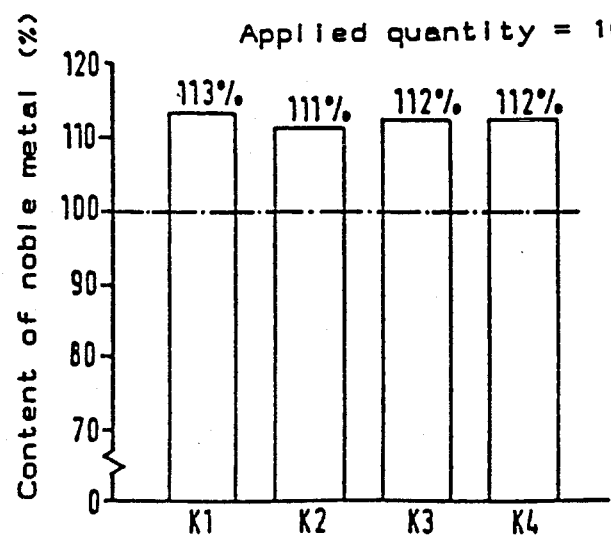
Fig. 8 Example 1
Radial distribution of noble metal
Applied quantity = 100%

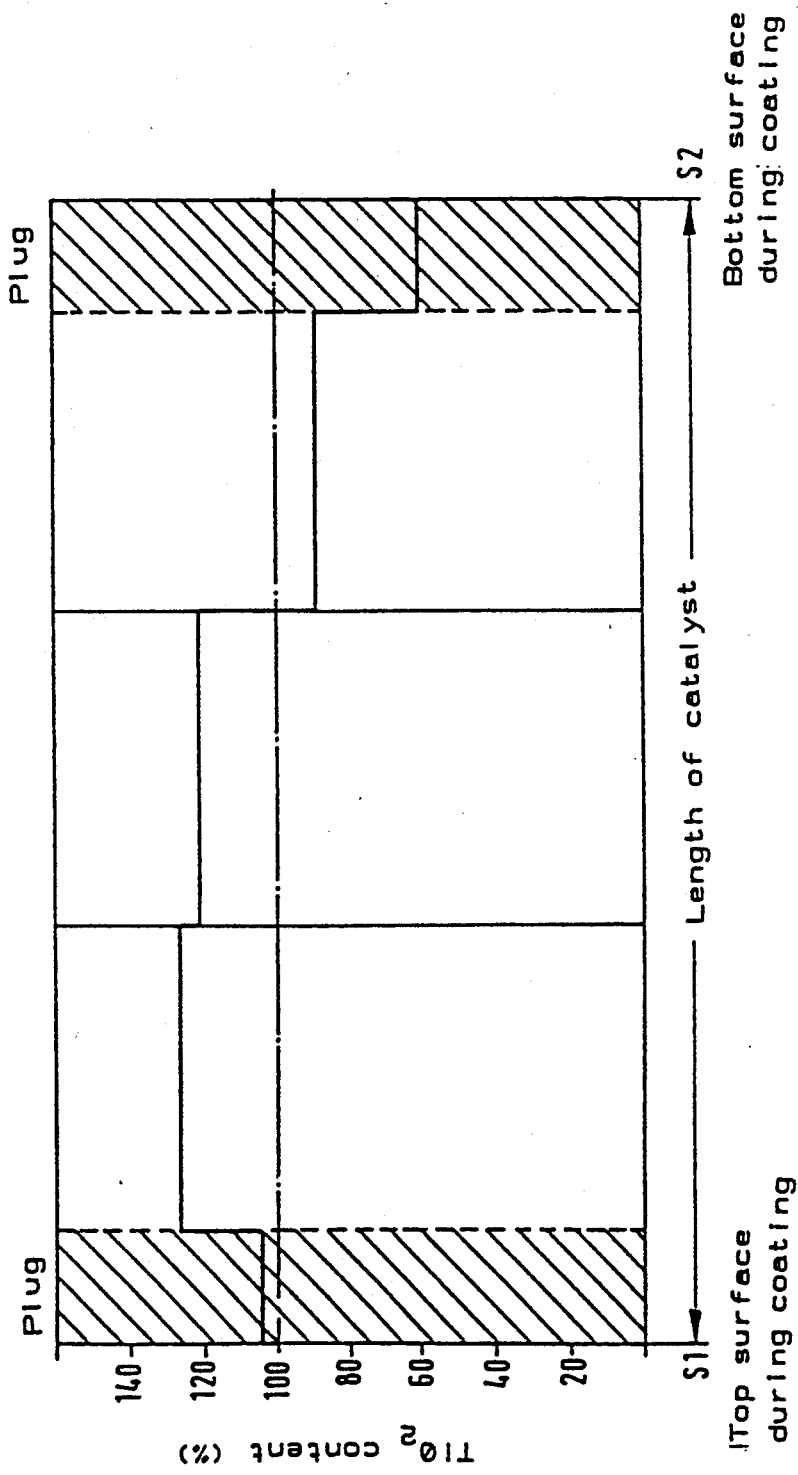

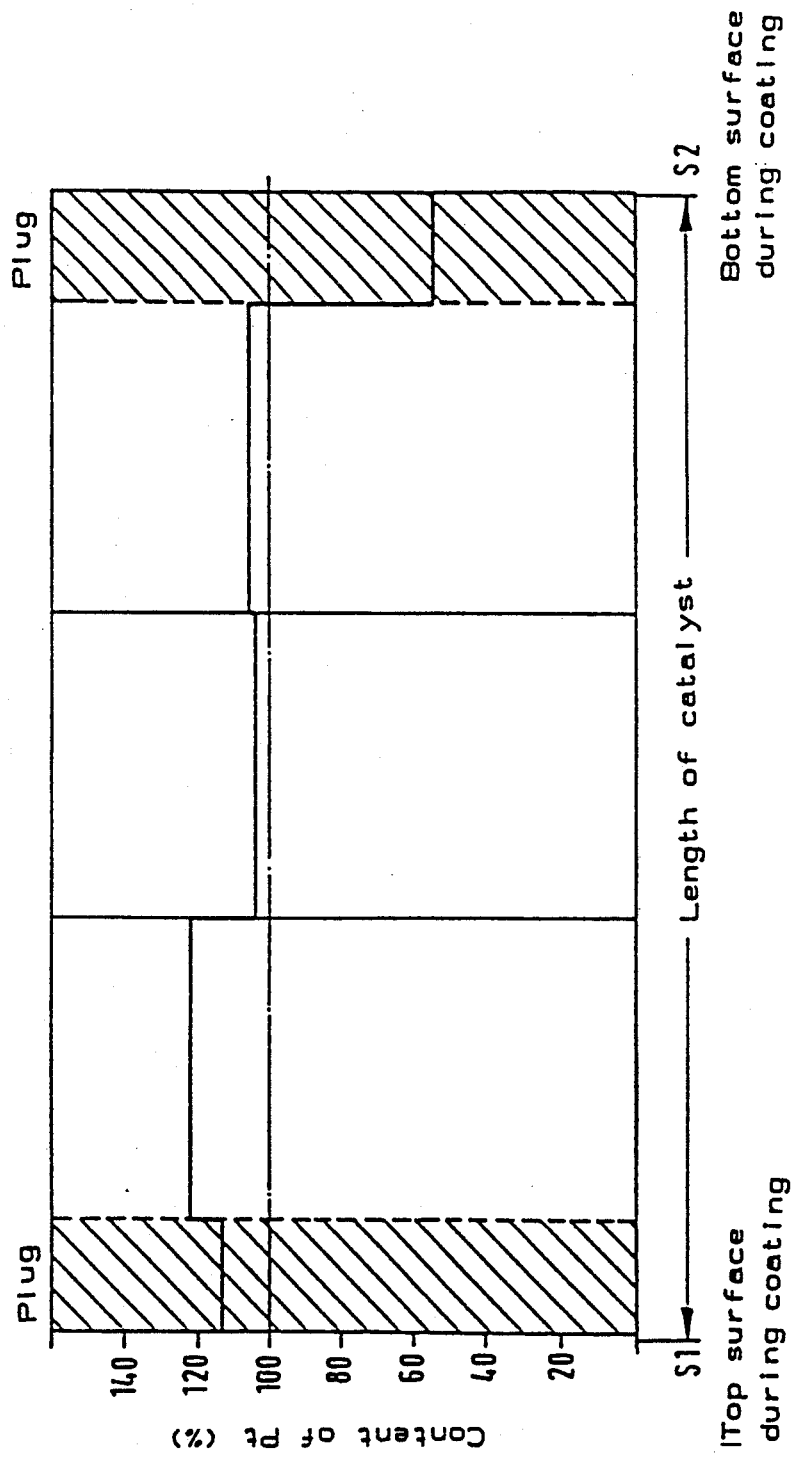

MEANS AND DEVICE FOR UNIFORMLY LOADING ONE-PIECE CARRIER MEMBERS WITH A DEFINED QUANTITY OF DISPERSIONS OR SOLUTIONS

INTRODUCTION AND BACKGROUND

The present invention relates firstly to means for uniformly loading one-piece ceramic or metal carrier members more particularly for catalysts, with a desired quantity of substance from dispersions or solutions, and methods of operating the means, a first more complicated means being operated automatically and a second means, simpler than then first, being operable partly automatically or by hand. The invention also relates to methods of working with the means and with preferred variants thereof.

The term "one-piece carrier member" is used to mean e.g. monolithic carrier members with flow ducts, extending all through or closed at alternate ends (diesel filters). The term also includes foamed members or members made of compression molded fibre knitted fabric or compression molded fibre mats.

The prior art method of loading the aforementioned carrier members with dispersions of surface-increasing metal oxides and/or solutions of catalytically active metal salts has been to immerse them in an excess of dispersion or solution or to wash or spray them with an excess thereof. The amounts of material absorbed by the carrier members always vary with their maximum individual absorption capacity, which is a disadvantage when producing uniform catalysts.

SUMMARY OF THE INVENTION

An object of the present invention therefore is to achieve desired uniform loading of a set of carrier members in the loading range below the lowest maximum individual absorption capacity of a number of members to be coated, and to solve this problem by a suitable means and by appropriate methods.

The present invention also relates to means for uniformly loading one-piece ceramic or metal carrier members, more particularly for catalysts, with a desired quantity of substance from dispersions or solutions.

A feature of the invention relates to the apparatus as described hereinafter.

An important component of the means according to the invention is the construction of the distributor tray comprising numerous discharge pipes formed with bores and preventing the distributed liquid from accumulating on the underside of the distributor tray.

According to the invention, even very fine-celled monolithic catalyst carriers have to be uniformly loaded in a defined manner and, for manufacturing reasons, the underside of the distributor tray can receive only a limited number of discharge spouts. Accordingly, a feature of the invention resides in means whereby each duct inlet of the monolith comes directly under one of the spouts at least once and preferably more than once during the loading process.

BRIEF DESCRIPTION OF DRAWINGS

The present invention will be further understood with reference to the drawings, wherein:

FIG. 3a is a section along line IIIa—IIIa in FIG. 3a,

FIG. 4 shows simple rotation;

FIG. 5 shows oscillating motion in the x and y direction (to DIN 5, Part 10, page 2);

FIG. 6 shows simple rotation with oscillating motion in the y direction and,

FIGS. 7–10 show distributions of coating or impregnating substances applied as per Examples 1 and 2.

FIG. 7 shows the distribution of noble metal along the longitudinal axis of a carrier loaded according to example 1;

FIG. 8a diagrammatically represents the position of the drilling cores K1–K4 in carrier (1) for determining the radial distribution of noble metal shown in FIG. 8;

FIG. 8 shows the radial distribution of noble metal of a carrier loaded according to example 1;

FIG. 9 shows the distribution of $TiO_2$ along the axis of a carrier loaded according to example 2;

FIG. 10 shows the distribution of Pt along the axis of a carrier loaded according to example 2.

DETAILED DESCRIPTION OF INVENTION

Figure 1:
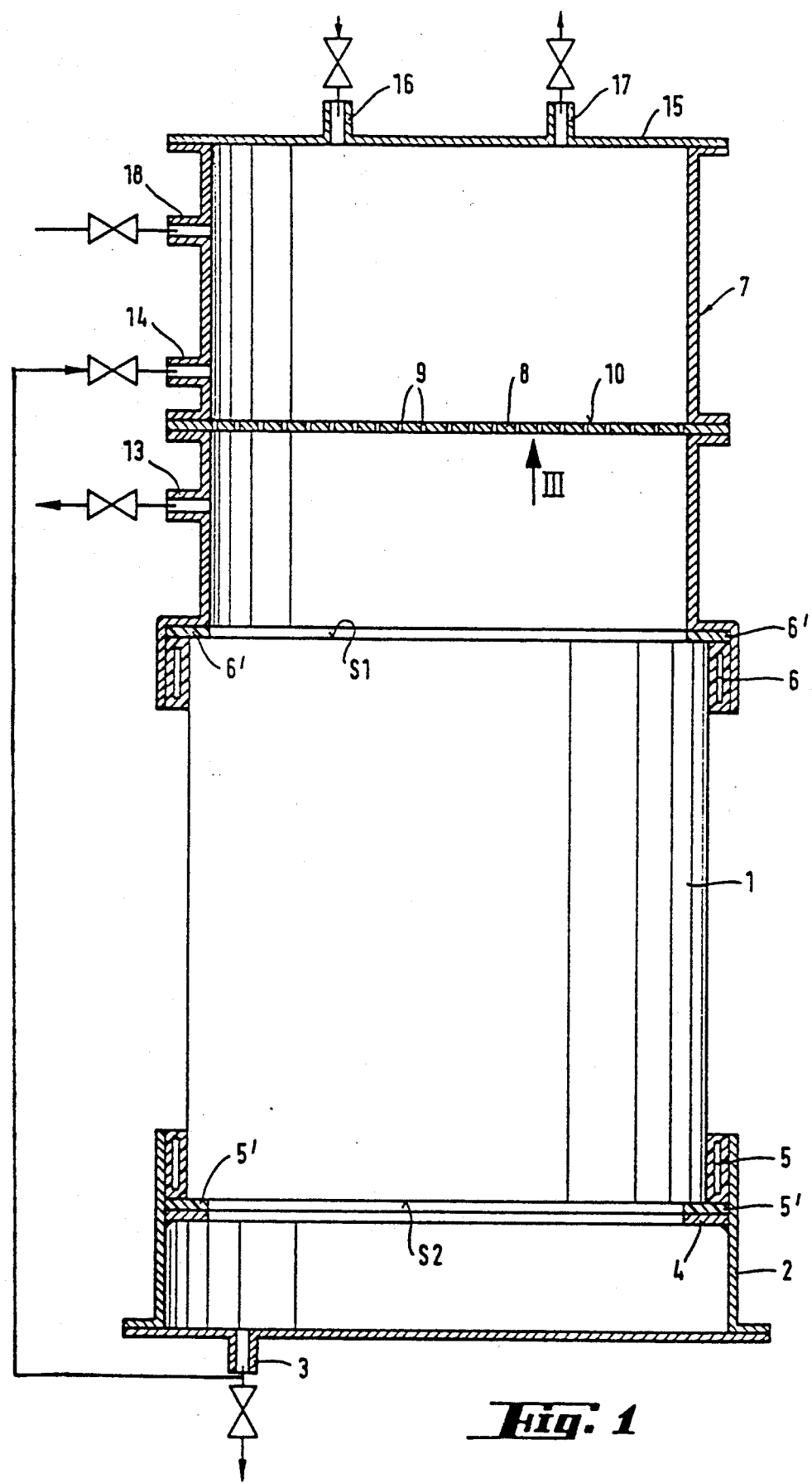
FIG. 1 shows a section through a first variant of a means according to the invention.

In its broadest aspects, the present invention relates to a means for uniformly loading one-piece ceramic or metal carrier members, more particularly catalysts, with a desired quantity of dispersions or solutions, which is featured by a cup (2) matching the outer contour of the carrier (1) and holding the lower part thereof and optionally equipped with a sponge cloth and having an outlet pipe (3) disposed in its base. A ring or tongue arrangement (4) is disposed at a distance from the base of the cup and on the inner casing thereof and supporting the edge of the bottom end of the carrier. Optionally, sealing means (5,5') are included for the interior of the cup below the bottom of the carrier from the carrier casing or the supported part of the bottom thereof. The last mentioned means can be in the form of an inflatable sleeve (5) or a sealing ring (5') placed on the supporting surface or surfaces. A distributor head (7) likewise corresponding to the outer contour of the carrier and provided at its bottom end with an inflatable inner sleeve (6) for surrounding an upper casing portion of the carrier forms a part of the means. A distributor tray (8) with perforations (9) is disposed over the cross-section of the distributor head in the bottom portion thereof but at a distance from the bottom edge thereof is provided. The top surface (10) of this tray is flat and the underside thereof is milled around each outlet mouth (11) to form respective downwardly projecting drip spouts (12). An aeration pipe (13) is mounted disposed in the jacket of the distributor head under the distributor tray. Also, a dispersion or solution supply pipe (14) is disposed in the distributor head casing above the tray. Finally, a cover (15) closing the distributor head is located at the top in an airtight manner and includes an aeration pipe (16), and a negative-pressure pipe (17). A pressure-measuring pipe (18) is disposed at the side under the cover.

In another aspect of the invention there is provided a simplified means including a cup (2) matching the outer contour of the carrier (1) and surrounding the lower part thereof and optionally provided with a sponge cloth (3'). An upwardly open distributor head (7) is provided having its bottom edge adapted to be placed on the edge of the top surface of the carrier with interposition of an annular sealing means (6'). The device has a distributor tray (8) with perforations (9) disposed above the distributor head cross-section in the lower portion thereof but at a distance from its underside. The top surface (10) of the distributor tray is flat and its underface is milled around each outlet mouth (11) to form respective downwardly projecting drip spouts (12).

Still another aspect of the invention relates to the device of the above description wherein the portion of the distributor head casing lying above the top surface of the carrier is recessed to form a surface, dimensioned so as to expose the surface area actually required for supplying with dispersion or solution. Optionally, there is provided an annular seal (6'), for supporting the edge of the top surface of the carrier.

The device as described above can also be modified so that in the case of axially symmetrical carriers, the distributor head (7) is non-rotatably secured and the cup (2) holding the carrier (1) is connected to drives or vibrators which transmit a simple or oscillating rotatory motion and/or a rectilinear oscillating motion to the cup (2) along the x and y axis. In all cases except for simple rotation, a portion of the casing of the distributor head (7) disposed above the sealing means (6, 6') and below the pipe (13) if present, is replaced around the entire casing periphery by a ring of elastic material, preferably in the form of a rubber bellows.

An advantageous embodiment of the means according to the invention therefore provides for the feature of a ring of elastic material or a rubber coating for preventing vibration of the carrier from being transmitted to the distributor tray.

The invention also relates to variants of processes for operating the more complicated means according to the following method embodiment of the invention.

The method of operating the means according to the above description is carried out in a sequence wherein:

(a) the carrier (1) is placed on the supporting means (4) in the cup (2) and, optionally, a seal (5, 5') is made and the distributor head (7) is placed on the carrier or the cup (2) is raised so as to insert the carrier into the distributor head, after which a seal (6, 6') is made and the aerating cock (13) is closed, negative pressure is applied through pipe (17), a dispersion or solution is supplied through pipe (14), and the negative pressure is cut off and the apparatus is aerated or pressurized via pipe (16) or (b) the carrier (1) is placed on the supporting means (4) in the cup (2) and, if required, a seal (5, 5') is made and the cup (2) is raised so that the top surface of the carrier is pushed close under the sealing means (6'), a negative pressure is applied through pipe (17), a dispersion or solution is supplied through pipe (14), the negative pressure is then switched off and the apparatus is aerated through pipe (16) or pressurized after making a seal (6, 6'), and by means of the features in (a) or (b) in each case the amount and concentration of dispersion or solution for the required loading within the capacity of the carrier is applied to the carrier through the distributor tray, the sleeve (6) and the sleeve (5) are released, after a residence interval if required, the distributor head (7) is moved upwards and the coated carrier (1) is taken out.

Preferably, in the above method after the dispersion or solution has been introduced into the distributor head and the negative pressure has been switched off, a slight excess pressure is first applied and the introduced liquid medium is then moved forward towards the underface of the carrier at a suitable speed, by controlled readjustment of the excess pressure.

In variant (b) the above method, the cup holding the carrier moves it upwards in the direction of the distributor head, sufficiently for the top surface of the carrier to be slightly below the sealing means 6', i.e. without touching them. This prevents rotation or vibration being transmitted to the distributor head. Another possibility is to move the dispersion or solution in reciprocation in the carrier ducts by applying pulses of negative pressure 17 or excess pressure. This is the method of controlling the distribution along the longitudinal axis of the carrier.

The axially symmetrical carrier can thus for example be rotated while being supplied with dispersion or solution. Immediately or some time afterwards, the motion is stopped, the cup 2 is raised so as to seal the carrier by the sealing means 6', and the liquid or dispersion is moved towards the underface by applying a controlled excess pressure via 16, or is distributed along the longitudinal axis of the carrier by periodically applying excess and negative pressure, optionally delayed. After a residence interval the seal 6, 6' is released, the carrier and cup are moved downwards and the coated carrier is removed.

This method, which is basically adequate for most kinds of carrier can be refined by moving the carrier in simple or oscillating rotation relative to the distributor head during loading (applicable only in the case of variant (b) above and/or by rectilinear oscillating movement along the x and y axis.

In a simpler version, the method of operating the simplified means as described above is carried out by a sequence of steps wherein: the carrier (1) is placed in the cup (2), optionally on the sponge cloth (3'), the distributor head (7) is placed on the carrier and sealed via the sealing means (6'), a dispersion or solution is poured into the distributor head and consequently the amount and concentration of dispersion or solution adapted to a desired load within the capacity of the carrier is applied by gravity to the carrier through the distributor tray (8), and any relatively small amounts of solution or dispersion flowing out of the bottom carrier surface are returned to the carrier surface.

During the loading process, the carrier (1) can be moved relative to the distributor head (7) in simple rotation or in oscillating rotation and/or in rectangular oscillating motion along the x and y axis.

The method according to the invention can be additionally refined in that any dispersion or liquid escaping from the bottom of the carrier during high-speed loading can be returned to the distributor head via a pump and pipe 3, or in the case of small quantities the base of cup 2, equipped with a sponge cloth, is pressed against the bottom surface, whereupon the carrier absorbs the rest. During this process the cock in the discharge pipe 3 in the basic embodiment of the invention remains closed.

The operation of the method according to the invention can be summarized as follows. One-piece carriers, uncoated or already coated with oxide, are uniformly loaded with dispersion or an impregnating fluid, starting from the top surface, by a distributor tray which acts on the aforementioned surface and constitutes a very important part of the invention. The volumes and concentrations of applied dispersion or impregnating fluid can be preset so as to obtain any desired loading of a set of carriers at or below the given lowest maximum individual absorption capacity.

The loading speed is important since the absorption process takes time, particularly in the case of porous carrier members. The loading speed can be controlled via a) the free cross-section in the perforated tray b) the diameter of the perforations c) the gas pressure operating on the liquid via the distributor tray.

d) the counteracting gas pressure on the perforation outlet side, and e) the negative pressure applied to the end of the carrier, and ensures uniform longitudinal distribution of the load over the carrier.

The distribution over the cross-sectional area is influenced by a) the number of perforations in the perforated tray per unit area b) movements of the carrier member during application of the dispersion or solution when the distributor head and perforated tray are stationary or (more complicated apparatus) during movement of the distributor tray when the distributor head and carrier members are stationary, influence also being exerted by the speed of motion and the arrangement of the perforations in the radial direction, avoiding circles and preferring a square arrangement of perforations, and c) a rotating or rotating and oscillating and/or sideways oscillating motion of a carrier member in the x and y direction relative to a stationary distributor head.

Some embodiments of the invention will now be illustrated with reference to the following examples:

EXAMPLE 1

Figure 3:
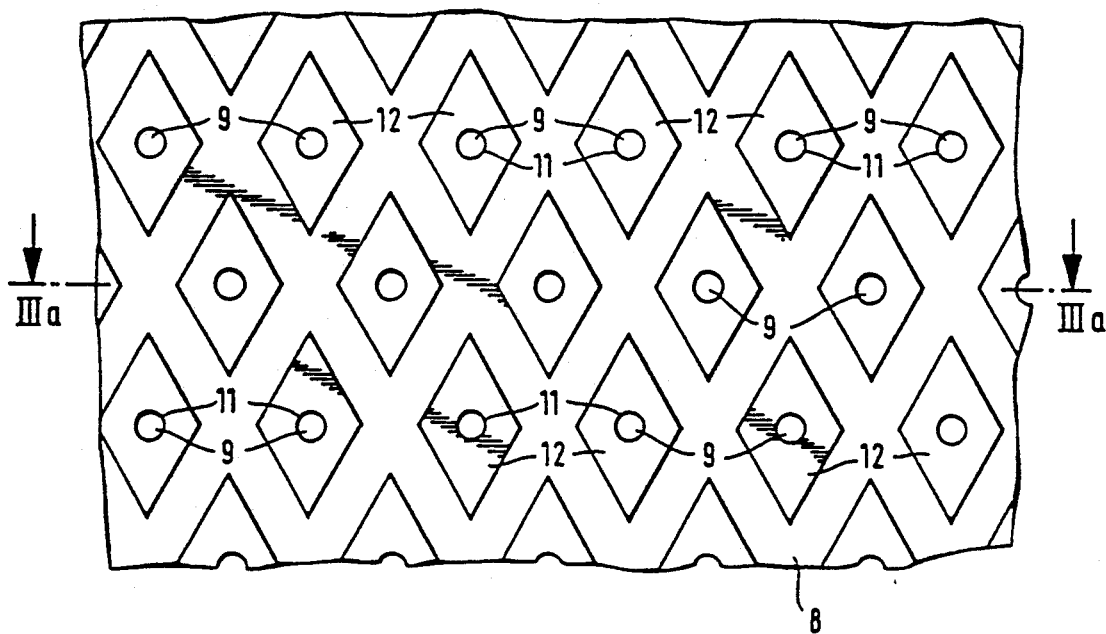
FIG. 3 is a larger-scale detailed view from below of a distributor tray according to FIGS. 1 and 2.
Figure 3A:
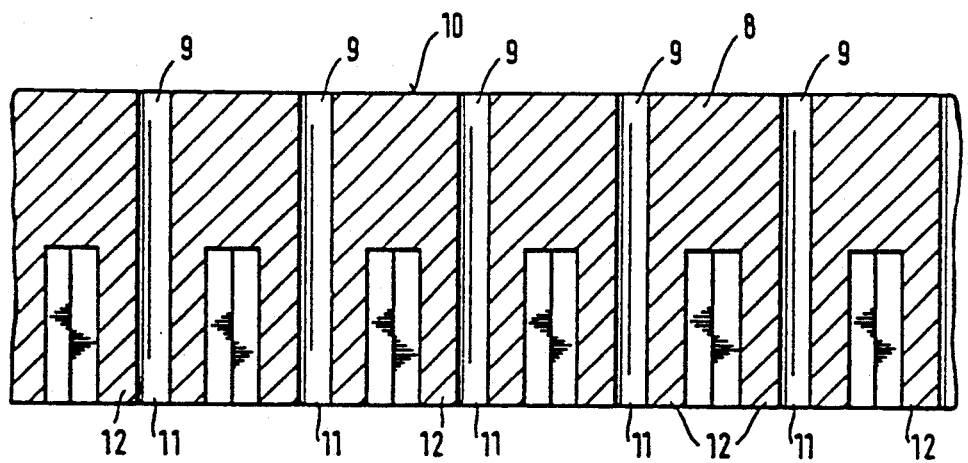
Figure 4:
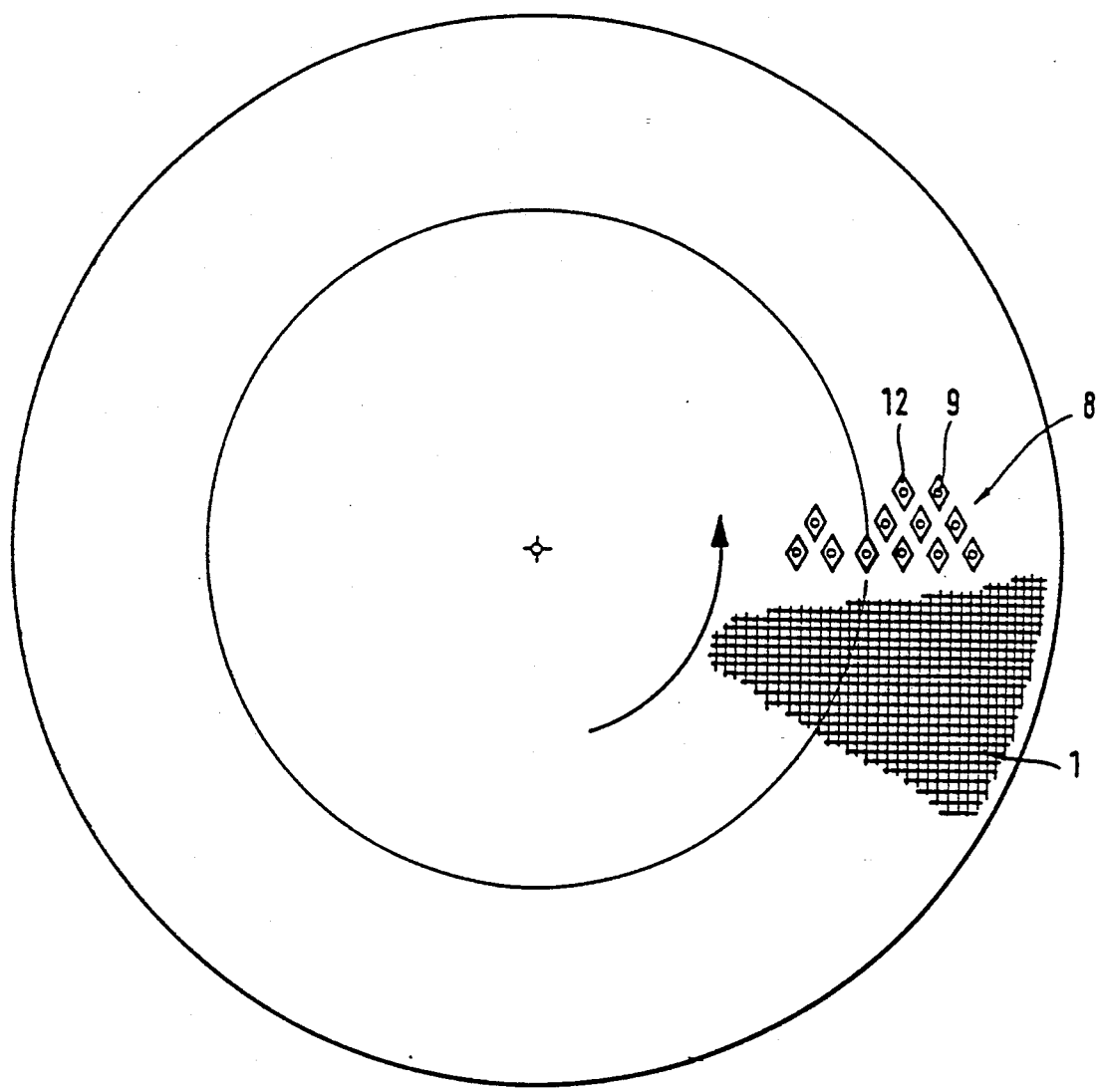
FIGS. 4–6 show the tracks on the upper carrier surface covered by the outflowing drops of liquid during varying motion of the moving carrier relative to an individual drip spout on the distributor tray.
Figure 5:
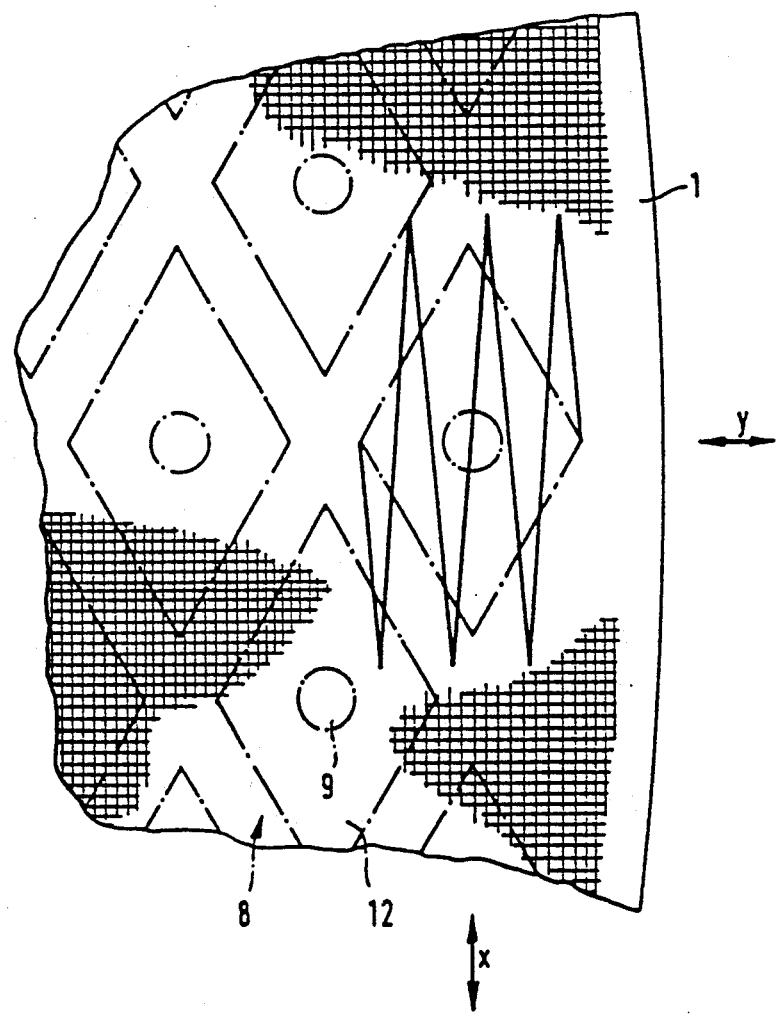
Figure 6:
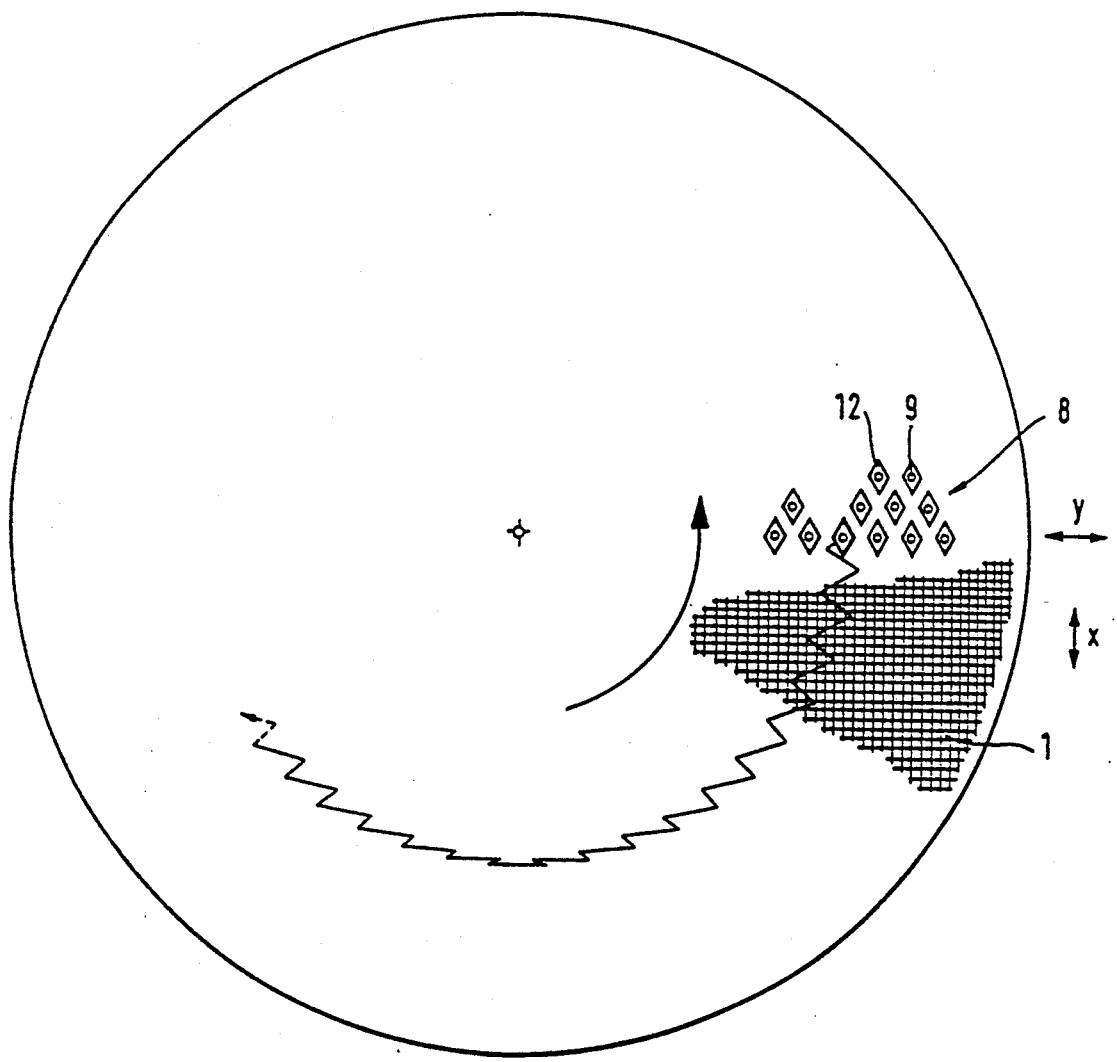

Use of the coating device in FIG. 1 with perforated tray constructed as per FIG. 3.

An inert ceramic carrier member made of cordierite with

| Diameter: | 143 mm |
| Length: | 152.4 mm |
| Cell density: | 62 cells/cm$^2$ |
| Wall thickness: | 0.165 mm | and an oxide coating of

| 280 g | Al$_2$O$_3$ |
| 48 g | CeO$_2$ |
| 24 g | ZrO$_2$ |
| 11 g | Fe$_2$O$_3$ | was impregnated with 310 ml of solvent mixture of H$_2$PtCl$_6$ and RhCl$_3$ containing 11.77 g Pt and 2.35 g Rh/l. The operating sequence was as follows:

Pre-coat upper surface of carrier 1 (S 1) with 40 ml H$_2$O for distribution of noble metal;

Place carrier on support 4 on cup 2;

Move cup 2 upwards until S 1 lies just below sealing means 6' (sealing means 5, 5' are not used);

Gently evacuate distributor head 7 through pipe 17 (60 mm water column negative pressure)

Supply 310 ml of noble-metal solution through pipe 14;

Rotate cup and carrier at 120 rpm;

Close pipe 17 and simultaneously open pipe 16;

Deliver solution at slight excess pressure (0.5 bar) within 1 or 2 seconds through distributor tray 8 (perforation diameter 0.8 mm, space between perforations 5 mm) to surface S 1;

Switch off rotation;

After a residence time of 5 seconds, press carrier against distributor head-seal 6' becomes operative;

Apply excess pressure to S 1 through pipe 16 and distributor tray 8 (the solution in the ducts is pushed downwards towards cup 2);

Prolong the pushing time by alternate opening and closing of cock 16 and 17 (thus alternately applying excess and negative pressure);

Close cock 16 and 17 after 15 seconds, thus loosening seal 6';

Remove coated carrier.

Dry coated carrier resting on the bottom surface S 2 in continuous drier in a stream at 100° C.;

Distribution of noble metal:

Longitudinal axis—see FIG. 7

Radial—see FIG. 8

FIG. 8a diagrammatically represents the position of the drilling cores K1-K4 in carrier 1.

The amount of solution applied (precoating with solution of H$_2$O+noble metal) was 85% of the water absorption capacity.

EXAMPLE 2

Figure 2:
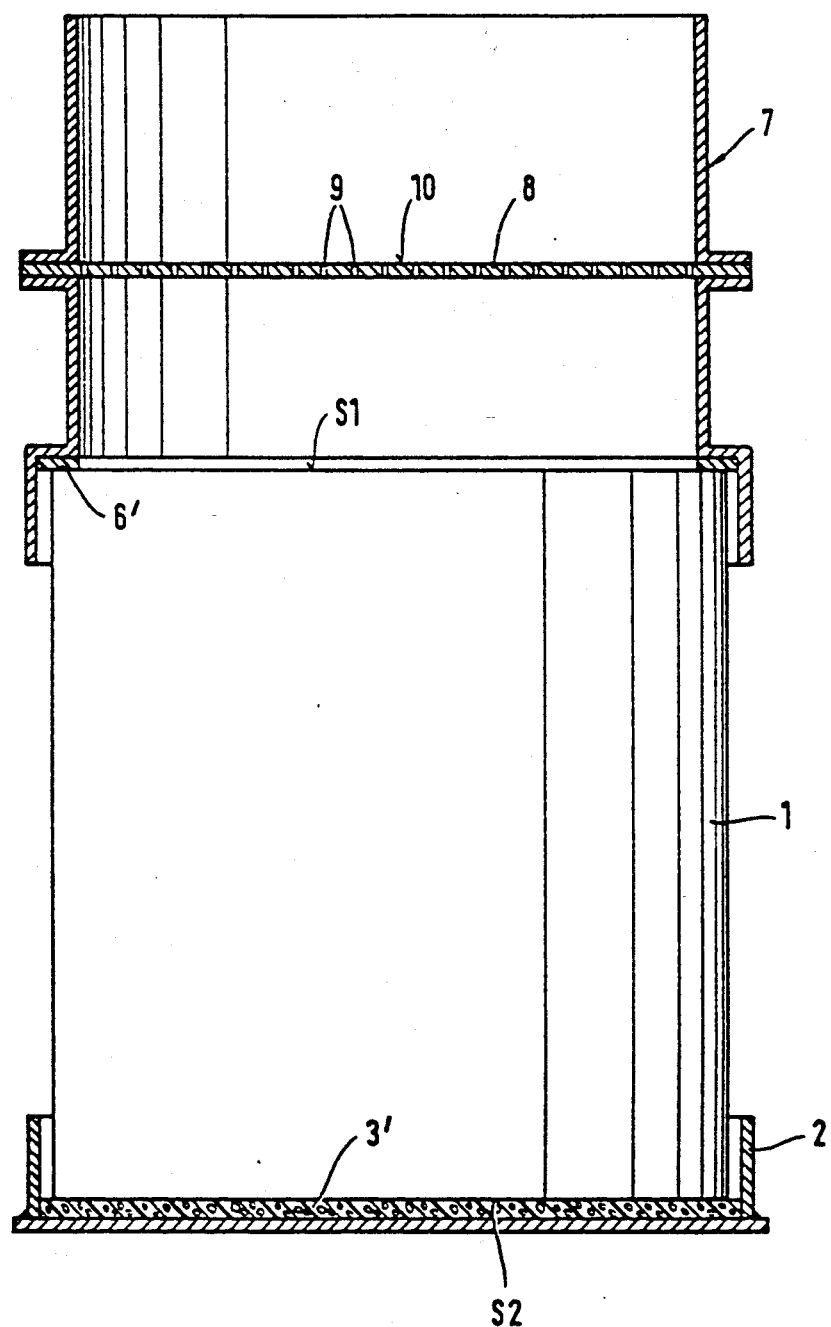
FIG. 2 shows a section through a second variant corresponding to FIG. 1.

Use of the simplified coating apparatus in FIG. 2, the perforated tray being constructed as per FIG. 3:

A ceramic diesel particle filter made by Messrs NGK with

| Diameter: | 143.8 mm |
| Length: | 152.4 mm |
| Cell density: | 15.5 cells/cm$^2$ |
| Wall thickness: | 0.64 mm | and ducts 15 mm deep and closed alternately at the front and back end was precoated with 60 g V$_2$O$_5$.

Coating With TiO$_2$

In this process the carrier 1 was placed in cup 2, the distributor head 7 and the sealing means 6' were fitted and 430 ml of a TiO$_2$ dispersion containing 60 g TiO$_2$ was poured into the distributor head. Within 15-18 seconds the dispersion ran through the perforated tray 8 on to the upper surface of the carrier and was distributed over the entire length thereof.

The perforated tray had 1.2-mm perforations spaced at 10 mm, corresponding to one perforation per cm$^2$. 85% of the water absorption capacity was used.

TiO$_2$ distribution—see FIG. 9.

The coated carriers were dried at 300° C. for 2 hours and, after cooling, were coated with noble metal.

Coating With Noble Metal

The carrier 1 for coating was placed in the cup 2, in which a sponge cloth 3' was placed.

The distributor head 7 and sealing means 6' were fitted and 490 ml of tetra-ammine platinum (II) hydroxide solution containing 4.37 g Pt was poured on to the distributor tray 8. Within 12 seconds the solution ran over the distributor tray (FIG. 3) on to the upper surface of the carrier and then spread over the entire length thereof.

The distributor tray was the same as used for coating with TiO$_2$. 95% of the water absorption capacity was used. The coated carrier was heat-treated at 300° C. for 2 hours. Pt distribution—see FIG. 10.

EXAMPLE 3

Use of the coating device according to FIG. 1 with a perforated tray constructed according to FIG. 3

A ceramic carrier member made of cordierite with

| | |
|---|---|
| Diameter: | 143.8 mm |
| Length: | 152.4 mm |
| Cell density: | 62 cells/cm$^2$ |
| Wall thickness: | 0.165 mm | was coated with 900 g of a 56% oxide dispersion which had the following composition after removal of water and heat-treatment at 300° for 30 minutes:

| | |
|---|---|
| 61.35 wt. % | Al$_2$O$_3$ |
| 36.81 wt. % | CeO$_2$ |
| 1.84 wt. % | ZrO$_2$ |

The coating process

Place carrier 1 on tongues 4 in cup 2;
Raise cup 2 until upper surface is just below sealing means 6';
Apply 60 mm water-column negative pressure to distributor head 7 through pipe 17;
Introduce dispersion into distributor head through pipe 14;
Rotate cup and carrier at 42 rpm;
Close pipe 17 and apply one bar excess pressure to distributor head through pipe 16;
Press dispersion through perforated plate 8 (1.2 mm perforations, 10 mm spacing) on to upper surface S1;
Deliver dispersion in 2-3 seconds;
Stop rotation;
Press carrier against sealing means 6';
Apply excess pressure so as to drive dispersion downwards through the ducts and distribute it along the length of the carrier;
The coated carrier, resting on the bottom surface S2 was dried in a stream of air at 150° C. for 0.5 hours and then heat-treated.

In order to determine the surface distribution along the length, the carrier member was divided into three.

| Result: | Top | S 1 | 93.3% |
|---|---|---|---|
| | Middle | | 100.0% |
| | Bottom | S 2 | 106.0% |

EXAMPLE 4

Use of the coating device according to FIG. 1 with a perforated plate constructed according to FIG. 3

A ceramic carrier member made or cordierite with

| | |
|---|---|
| Diameter: | 143.8 mm |
| Length: | 152.4 mm |
| Cell density: | 62 cells/cm$^2$ |
| Wall thickness: | 0.165 mm | was coated with 750 g of an oxide dispersion (=83% of the water absorption capacity) and, after heat-treatment under the conditions in Example 3, had the following oxide coating:

| | |
|---|---|
| 252 g | Al$_2$O$_3$ |
| 95 g | CeO$_2$ |
| 3 g | ZrO$_2$ |
| 350 g | Oxides |

The dispersion coating was made as follows:
Place carrier 1 on tongues 4 in cup 2;
Place cup 2 on vibrator table and move it upwards against sealing means 6';
Apply 15 mm water-column negative pressure to distributor head 7 through pipe 17;
Run dispersion through pipe 14 on to distributor tray 8;
Operate vibrator at 50 Hz and 0.8 mm amplitude (x direction);
Close pipes 17 and 18;
Through pipe 16 apply air at 1.0 bar to the dispersion;
Press dispersion through perforated tray 8 (0.8 mm perforations, 5 mm spacing) on to the top surface;
Deliver dispersion in 10–15 seconds;
At same air pressure, press dispersion over carrier towards the bottom surface thereof;
After 10 seconds, shut off air supply through pipe 16;
Switch off vibrator;
Move cup 2 downwards;
Take out carrier 1;
Gently blow out ducts from below in the direction towards the top surface of carrier;
Dry the part horizontally from S 1 in stream of air (120° C.) and then heat-treat at 500° C. for 1 hour;
Resulting longitudinal washcoat distribution, carrier members divided into three

| 350 g = 100% | | |
|---|---|---|
| 99.3% | S 1 | top |
| 99.9% | | middle |
| 100.8% | S 2 | bottom |

Washcoat distribution radially in %:
4 cores 25.4 mm in diameter in an 85 mm perforated circle were drilled longitudinally out of the parts cut in three. The washcoat absorption was determined against the weight distribution:

| Core | Top | Middle | Bottom |
|---|---|---|---|
| K1 | 100.2 | 100.4 | 98.6 |
| K2 | 99.2 | 98.3 | 98.2 |
| K3 | 101.3 | 101.5 | 99.1 |
| K4 | 98.8 | 100.0 | 103.0 |

EXAMPLE 5

Use of the coating means according to FIG. 1 with a perforated tray constructed according to FIG. 3

A metal carrier member produced by Messrs Emitex

| | |
|---|---|
| Diameter: | 90 mm |
| Length: | 74.5 mm |
| Cell density: | 62 cells/cm² |
| Wall thickness: | 0.05 mm | was coated with 40 g of a precoating substance.

The precoated carriers were coated with 130 g of a 53.8% oxide dispersion (=90% of water absorption capacity) and, after drying and heat-treatment, had an oxide coating of

| | |
|---|---|
| 53.9 g | $Al_2O_3$, |
| 93.3 g | $CeO_2$, |
| 4.7 g | $ZrO_2$ |
| 2.1 g | $Fe_2O_3$ |

The coating was made as follows, the apparatus being adapted to the dimensions of the carrier;

Place carrier 1 on support 4 in cup 2;

Move cup 2 upwards—sealing means 6' becomes operative;

Apply slight negative pressure (15 mm water column) through pipe 17;

Introduce dispersion through 14;

Apply vibrator to cup at 50 Hz and 0.8 mm amplitude (x direction);

Close cock 17 and apply 0.5 bar excess pressure via cock 16;

Press dispersion through perforated tray 8 (1.2 mm perforations, 5 mm spacing) on to the upper surface of the carrier within 2 seconds;

After delivering the dispersion, open cocks 17 and 16 alternately and after a delay push washcoat towards the bottom surface;

Switch off vibrator, close cocks 16 and 17;

Move cup 2 downwards after a residence time of 5 seconds;

Using compressed air, gently distribute washcoat upwards from the bottom surface;

Place part on top surface, run through belt drier in a stream at 70°–150° C. and then heat-treat for 1 hour at 500° C.

The same optimum longitudinal and radial distribution of the oxide coating was obtained as in Example 4.

Further variations and modifications of the foregoing invention will be apparent to those skilled in the art and are intended to be encompassed by the claims appended hereto.

We claim:

1. A method for loading a carrier, comprising:
supporting the carrier at one end on supporting means;
placing a distributor head in contact with an opposite end of the carrier, said distributor head including a distributor tray, a distributor head casing above the tray and carrier receiving means for receiving the opposite end of the carrier in a position below the distributor tray;
introducing a specific quantity of dispersion or solution into said casing with the specific quantity being preset so as to load the carrier below a given maximum individual absorption capacity of the carrier; and
forcing the introduced dispersion or solution through the distributor tray so as to load the carrier positioned below the distributor tray.

2. A method as recited in claim 1, further comprising forming a negative pressure area within said casing by drawing air through a first conduit and the step of introducing the dispersion or solution includes forcing the dispersion or solution through a second conduit and into the negative pressure area in said casing while retaining the area at a negative pressure.

3. A method as recited in claim 1, further comprising rotating the carrier about a central axis of the carrier following introduction of the dispersion or solution into the carrier.

4. A method as recited in claim 1, wherein said step of forcing the dispersion or solution through the distributor tray includes introducing pressurized air and varying the pressure of the air in a controlled fashion so as to spread the specific quantity of dispersion or solution travelling through the carrier to a far end of the carrier.

5. A method as recited in claim 1, further comprising providing intermittent periods of negative pressure following introduction of the dispersion or solution so as to help in spreading the specific quantity of dispersion or solution travelling through the carrier.

6. A method as recited in claim 5, wherein said step of forcing the dispersion or solution through said distribution tray includes introducing pulses of high pressure in between the periods of negative pressure.

7. A method as recited in claim 5, wherein said step of introducing a specific quantity of dispersion or solution includes introducing a quantity of solution or dispersion between 83% to 95% of the water absorption capacity of the carrier.

8. A method as recited in claim 7, further comprising the step of rotating the carrier while the carrier is being loaded.

9. A method as recited in claim 8, further comprising the step of oscillating the carrier while the carrier is being rotated.

10. A method as recited in claim 1, wherein said step of introducing a specific quantity of dispersion or solution includes introducing a quantity of solution or dispersion between 83% to 95% of the water absorption capacity of the carrier.

11. A method as recited in claim 10, further comprising the step of returning dispersion or solution which passes through the carrier back to the carrier.

12. A method as recited in claim 1, further comprising the step of oscillating the carrier while the carrier is being loaded.

13. A method as recited in claim 1, further comprising forming a seal between the carrier and said receiving means after the step of forming a negative pressure area and prior to the step of introducing air into said casing.

14. A method as recited in claim 1 wherein the step of forcing the introduced dispersion or solution through the distributor tray includes introducing air as a pressure of 0.5 bar to 1.0 bar.

15. A method as recited in claim 2 wherein the step of forming a negative pressure includes forming a negative pressure of 15 mm to 60 mm water column.

16. A method for uniformly loading one-piece carrier members with a desired quantity of substance from dispersions or solutions to achieve a loading of carrier members in the loading range below the lowest maximum individual absorption capacity of the carrier members, comprising:
supporting a carrier member (1) at a bottom surface (S2) on supporting means (4) in a cup (2) which has an outlet conduit (3) for excess dispersion or solution;

placing a distributor head (7) on the top surface (S1) of the carrier, said distributor head including a distributor tray (8), a distributor head casing above the tray with three separate conduits (14,16,17) opening into said casing and said distributor head further including a lower chamber with an aerating cock (13), and carrier receiving and sealing means (6,6') for receiving the top end of the carrier in a position below the distributor tray (8);

making a seal (6,6') between the carrier and said carrier receiving and sealing means and closing the aerating cock (13);

forming a negative pressure area within said casing and above said tray by drawing air out of the casing through a first one of said three conduits (17);

introducing through a second of said three conduits (14) into the negative pressure area in said casing an amount and concentration of the dispersion or solution which is an amount that is below the absorption capacity of the carrier, and, at the same time, retaining said casing at a negative pressure;

cutting off said first conduit (17) after the introduction of the dispersion or fluid, so as to discontinue forming the negative pressure area;

introducing air into said casing through a third of said three conduits (16) such that the dispersion or solution flows through the distributor tray so as to load the carrier positioned below the distributor tray.

17. A method as recited in claim 16, further comprising the step of moving the carrier along a horizontal plane essentially parallel with said distributor tray in oscillating motion during the loading of the carrier with the dispersion or solution, and wherein said receiving and sealing means (6,6') includes a ring of elastic material to prevent the oscillations of the carrier from being transmitted to the distributor tray.

18. A method as recited in claim 16, wherein said step of introducing air into said casing includes injecting pressurized air through said third conduit (16) and into said casing so as to assist in forcing the dispersion or solution through said distributor tray.

19. A method as recited in claim 16, wherein said step of introducing air includes aerating said casing via said third conduit (16).

20. A method as recited in claim 16, wherein said carrier includes a top end with an outer periphery and a top surface and said receiving and sealing means includes a sealing member and said step of placing said distributor head includes the step of positioning said sealing member so as to contact and surround the outer periphery of the top end of the carrier while maintaining the top surface of the carrier free of contact with said receiving and sealing means.

21. A method as recited in claim 20, wherein said step of introducing air into said casing includes injecting pressurized air through said third conduit (16) and into said casing so as to assist in forcing the dispersion or solution through said distributor tray.

22. A method as recited in claim 20, wherein said step of introducing air includes aerating said casing via said third conduit (16).

23. A method as recited in claim 20, further comprising rotating the carrier about a central axis.

24. A method as recited in claim 23, further comprising subjecting the carrier to an oscillatory motion during the loading of the carrier with the dispersion or solution, and wherein said sealing member (6) includes a ring of elastic material to prevent the oscillations of the carrier from being transmitted to the distributory tray.

25. A method as recited in claim 20, further comprising the step of directing the flow of dispersion or solution through a plurality of downwardly extending and separated spouts (12) formed on an under surface of said distributor tray.

26. A method as recited in claim 20, wherein after having directed the flow of dispersion or solution into the carrier the dispersion or solution is reciprocated in the carrier ducts by applying alternating pulses of negative pressure through said first conduit (17) and excess pressure through said third conduit (17).

27. A method as recited in claim 20, further comprising returning any dispersion or solution escaping from a bottom surface (S2) of the carrier during loading to the distributor tray (8) by conduit (3) and a pump.

28. A method as recited in claim 16, further comprising the step of directing the flow of dispersion or solution through a plurality of downwardly extending and separated spouts (12) formed on an under surface of said distributor tray.

29. A method as recited in claim 16, wherein after having directed the flow of dispersion or solution into the carrier the dispersion or solution is reciprocated in the carrier ducts by applying alternating pulses of negative pressure through said first conduit (17) and excess pressure through said third conduit (16).

30. A method as recited in claim 16, further comprising returning any dispersion or solution escaping from a bottom surface (S2) of the carrier during loading to the distributor tray (8).

31. A method as recited in claim 30, wherein said step of returning escaping dispersion or solution to the distributor tray includes directing the escaping fluid back into the same carrier through which the escaping fluid originally passed.

32. A method for uniformly loading one-piece carrier members with a desired quantity of substance from dispersions or solutions to achieve a loading of carrier members, comprising:

supporting the carrier member (1) along a bottom surface (S2) in a cup shaped supporting means on a sponge mat (3') provided in said cup shaped supporting means;

placing a distributor head (7) in contact with the top surface (S1) of the carrier, said distributor head including a distributor tray (8) positioned above the top surface (S1) of the carrier and surrounded about an upper surface (10) by an open ended casing;

introducing an amount of dispersion or solution onto the upper surface (1) of said distributor tray (8);

directing the solution or dispersion through a plurality of spouts (12) formed in said distributor tray (8) and into contact with the carrier;

absorbing any excess solution and dispersion flowing out of the bottom carrier surface (S2) with said sponge mat (3') and returning excess fluid to the carrier by compressing the sponge mat (3') against said bottom carrier surface.

33. A method as recited in claim 32, wherein the step of directing the solution through said distribution tray includes directing the fluid through a plurality of spouts (12) extending off from an underlying surface and being spaced from one another so as to avoid collection of the solution or dispersion on the undersurface of said distributor plate.

34. A method as recited in claim 32, wherein the step of introducing a dispersion or solution onto the upper surface of said distributor tray comprises introducing a quantity of dispersion or solution which is an amount below the absorption capacity of the carrier.

* * * * *